US008813565B2

(12) United States Patent
Caminada et al.

(10) Patent No.: US 8,813,565 B2
(45) Date of Patent: *Aug. 26, 2014

(54) READING CIRCUIT FOR MEMS GYROSCOPE HAVING INCLINED DETECTION DIRECTIONS

(71) Applicant: STMicroelectronics S.R.L., Agrate Brianza (IT)

(72) Inventors: Carlo Caminada, Pregnana Milanese (IT); Luciano Prandi, Bellinzago Novarese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,496

(22) Filed: Mar. 7, 2013

(65) Prior Publication Data

US 2013/0180331 A1 Jul. 18, 2013

Related U.S. Application Data

(63) Continuation of application No. 12/626,424, filed on Nov. 25, 2009, now Pat. No. 8,459,109.

(30) Foreign Application Priority Data

Jun. 26, 2009 (IT) .................................. TO09A0489

(51) Int. Cl.
*G01C 19/56* (2012.01)
(52) U.S. Cl.
USPC ........................................ 73/504.12; 73/510
(58) Field of Classification Search
USPC ............................................. 73/504.12, 510
See application file for complete search history.

(56) References Cited

U.S. PATENT DOCUMENTS

| 5,447,068 | A | 9/1995 | Tang |
| 5,728,936 | A | 3/1998 | Lutz |
| 5,895,850 | A | 4/1999 | Buestgens |
| 6,230,563 | B1 | 5/2001 | Clark et al. |

(Continued)

FOREIGN PATENT DOCUMENTS

| DE | 102007012163 A1 | 9/2007 |
| DE | 102006046772 A1 | 4/2008 |

(Continued)

OTHER PUBLICATIONS

Schofield, A.R. et al., "Multi-Degree of Freedom Tuning Fork Gyroscope Demonstrating Shock Rejection," IEEE Sensors 2007 Conference, Atlanta, Georgia, Oct. 28-31, 2007, pp. 120-123.

*Primary Examiner* — John Chapman, Jr.
(74) *Attorney, Agent, or Firm* — Seed IP Law Group PLLC (57) ABSTRACT

A multi-axis gyroscope includes a microelectromechanical structure configured to rotate with respective angular velocities about respective reference axes, and including detection elements, which are sensitive in respective detection directions and generate respective detection quantities as a function of projections of the angular velocities in the detection directions. The gyroscope including a reading circuit that generates electrical output signals, each correlated to a respective one of the angular velocities, as a function of the detection quantities. The reading circuit includes a combination stage that combines electrically with respect to one another electrical quantities correlated to detection quantities generated by detection elements sensitive to detection directions different from one another, so as to take into account a non-zero angle of inclination of the detection directions with respect to the reference axes.

17 Claims, 5 Drawing Sheets

(56) References Cited

U.S. PATENT DOCUMENTS

| | | |
|---|---|---|
| 6,250,156 B1 | 6/2001 | Seshia et al. |
| 6,308,567 B1 | 10/2001 | Higuchi et al. |
| 6,349,597 B1 | 2/2002 | Folkmer et al. |
| 6,513,380 B2 | 2/2003 | Reeds, III et al. |
| 6,520,017 B1 | 2/2003 | Schoefthaler et al. |
| 6,535,800 B2 | 3/2003 | Wallner |
| 6,722,197 B2 | 4/2004 | Knowles et al. |
| 6,752,017 B2 | 6/2004 | Willig et al. |
| 6,766,689 B2 | 7/2004 | Spinola Durante et al. |
| 6,837,107 B2 | 1/2005 | Geen |
| 6,848,304 B2 | 2/2005 | Geen |
| 6,928,872 B2 | 8/2005 | Durante et al. |
| 7,155,976 B2 | 1/2007 | Kai-Cheng et al. |
| 7,240,552 B2 | 7/2007 | Acar et al. |
| 7,284,429 B2 | 10/2007 | Chaumet et al. |
| 7,322,242 B2 | 1/2008 | Merassi et al. |
| 7,347,094 B2 | 3/2008 | Geen et al. |
| 7,398,683 B2 | 7/2008 | Lehtonen |
| 7,454,246 B2 | 11/2008 | Merfeld |
| 7,461,552 B2 | 12/2008 | Acar |
| 7,481,111 B2 | 1/2009 | Caminada et al. |
| 7,513,155 B2 | 4/2009 | Jeong et al. |
| 7,694,563 B2 | 4/2010 | Durante et al. |
| 7,797,998 B2 | 9/2010 | Menard et al. |
| 7,907,177 B2 | 3/2011 | Haino et al. |
| 8,037,756 B2 | 10/2011 | Caminada et al. |
| 8,042,394 B2 | 10/2011 | Coronato et al. |
| 8,042,396 B2 | 10/2011 | Coronato et al. |
| 8,256,290 B2 | 9/2012 | Mao |
| 8,272,267 B2 | 9/2012 | Tamura et al. |
| 8,312,769 B2 | 11/2012 | Coronato et al. |
| 8,342,023 B2 | 1/2013 | Geiger |
| 8,342,025 B2 | 1/2013 | Coronato et al. |
| 8,347,716 B2 | 1/2013 | Cazzaniga et al. |
| 8,375,789 B2 | 2/2013 | Prandi et al. |
| 2002/0189351 A1 | 12/2002 | Reeds et al. |
| 2006/0112764 A1 | 6/2006 | Higuchi |
| 2007/0062282 A1 | 3/2007 | Akashi et al. |
| 2008/0276706 A1 | 11/2008 | Hartmann et al. |
| 2010/0126269 A1 | 5/2010 | Coronato et al. |
| 2010/0132463 A1 | 6/2010 | Caminada et al. |
| 2010/0186507 A1 | 7/2010 | Gunthner et al. |
| 2011/0030473 A1 | 2/2011 | Acar |
| 2011/0061460 A1 | 3/2011 | Seeger et al. |
| 2011/0154898 A1 | 6/2011 | Cazzaniga et al. |
| 2012/0060604 A1 | 3/2012 | Neul et al. |

FOREIGN PATENT DOCUMENTS

| | | |
|---|---|---|
| DE | 102007054505 A1 | 5/2009 |
| EP | 1 619 471 A1 | 1/2006 |
| JP | 2005241500 A | 9/2005 |
| WO | 2006/043890 A1 | 4/2006 |
| WO | 2007/086849 A1 | 8/2007 |
| WO | 2007145113 A1 | 12/2007 |
| WO | 2009/033915 A1 | 3/2009 |

READING CIRCUIT FOR MEMS GYROSCOPE HAVING INCLINED DETECTION DIRECTIONS

BACKGROUND

1. Technical Field

The present disclosure relates to a reading circuit for a multi-axis MEMS gyroscope having detection directions inclined with respect to the reference axes, and to a corresponding multi-axis MEMS gyroscope.

2. Description of the Related Art

As is known, micromachining techniques enable manufacturing of microelectromechanical structures or systems (MEMS) within layers of semiconductor material, which have been deposited (for example, a polycrystalline-silicon layer) or grown (for example, an epitaxial layer) on sacrificial layers, which are removed via chemical etching.

Inertial sensors, such as accelerometers and gyroscopes, made using this technology are experiencing an increasing success, for example in the automotive field, in inertial navigation, or in the sector of portable devices.

In particular, integrated gyroscopes made of semiconductor material using MEMS technology are known. These gyroscopes operate on the basis of the theorem of relative accelerations, exploiting Coriolis acceleration. When an angular motion is applied to a mobile mass that is driven with a linear motion, the mobile mass "feels" an apparent force, called Coriolis force, which determines displacement thereof in a direction perpendicular to the direction of the linear motion and to the axis about which the angular motion is applied. The mobile mass is supported via springs that enable its displacement in the direction of the apparent force. On the basis of Hooke's law, the displacement is proportional to the apparent force so that, from the displacement of the mobile mass, it is possible to detect the Coriolis force and the value of the angular velocity that has generated it. The displacement of the mobile mass may for example be detected in a capacitive way, by determining, in conditions of resonance, the variations of capacitance (or, likewise, of the amount of charge) caused by the movement of mobile electrodes, fixed with respect to the mobile mass (or constituted by the mobile mass itself) and coupled to fixed electrodes.

MEMS gyroscopes have generally symmetrical sensing structures, comprising a pair of sensing masses for each reference axis about which a corresponding angular velocity is detected, the sensing masses being aligned to one another in a detection direction (generally coinciding with a corresponding reference axis). The reading circuit hence generally adopts a differential scheme based upon the differential capacitive variations associated to the sensing masses of each pair. In fact, whereas the Coriolis force tends to unbalance in opposite directions and substantially by the same amount the sensing masses of each pair (generating so-called "phase opposition" movements), external noise accelerations determine displacements thereof in the same direction and again by the same amount (generating so-called "in-phase" movements). By computing the difference of the electrical signals associated to the two sensing masses of each pair, it is hence ideally possible to isolate and measure just the contribution due to the Coriolis force and completely reject the contributions of noise.

For example, a biaxial MEMS capacitive gyroscope detects a first angular velocity directed along a pitch reference axis, designated in what follows by x, and a second angular velocity directed along a roll reference axis, designated hereinafter by y. By applying the Coriolis theorem, the following expressions are obtained:

$$M_c = -2 \cdot J \cdot \Omega_x \wedge \omega_z; M_c = -2 \cdot J \cdot \Omega_y \wedge \omega_z$$

where $M_c$ is the moment of the Coriolis force acting upon the sensing masses (which, as will be described in greater detail hereinafter, perform a detection movement of rotation out of the plane of the sensor), J is the moment of inertia of the same sensing masses, $\Omega_x$ and $\omega_y$ are the unknown angular velocities of pitch and roll acting about the respective reference axes, and $\omega_z$ is the driving angular velocity of the driving motion, directed along a vertical axis z (orthogonal to the plane of the sensor) and variable for controlling an electromechanical driving loop of which the MEMS structure of the sensor forms an integral part (the driving angular velocity also acting as a constant scale factor in the aforesaid expressions). In particular, this driving loop is made by an integrated circuit dedicated to generating and maintaining a movement of oscillation of a driving mass, to which the sensing masses are mechanically coupled, with driving angular velocity $\omega_z$ and at the resonance frequency.

The reading circuit of the gyroscope, as described for example in US Patent Application Publication Nos. US2008190200 and US2007289382, assigned to STMicroelectronics Srl, is configured so as to read, through the differential capacitive variation associated to the pitch or roll sensing masses, a signal proportional to the vector product $\Omega_x \wedge \omega_z$, in the case of pitch, or $\Omega_y \wedge \omega_z$, in the case of roll, the signal being of a DSB-SC (Dual Side Band-Suppressed Carrier) type, i.e., amplitude-modulated with a carrier given by the driving angular velocity $\omega_z$, due to driving of the structure at the resonance frequency. Next, by means of a coherent demodulation, the signal is first brought into baseband and then appropriately filtered, obtaining at output an electrical signal (in particular, a voltage signal) proportional to the unknown quantity alone, namely the pitch angular velocity $\Omega_x$ or the roll angular velocity $\Omega_y$.

Figure 1:
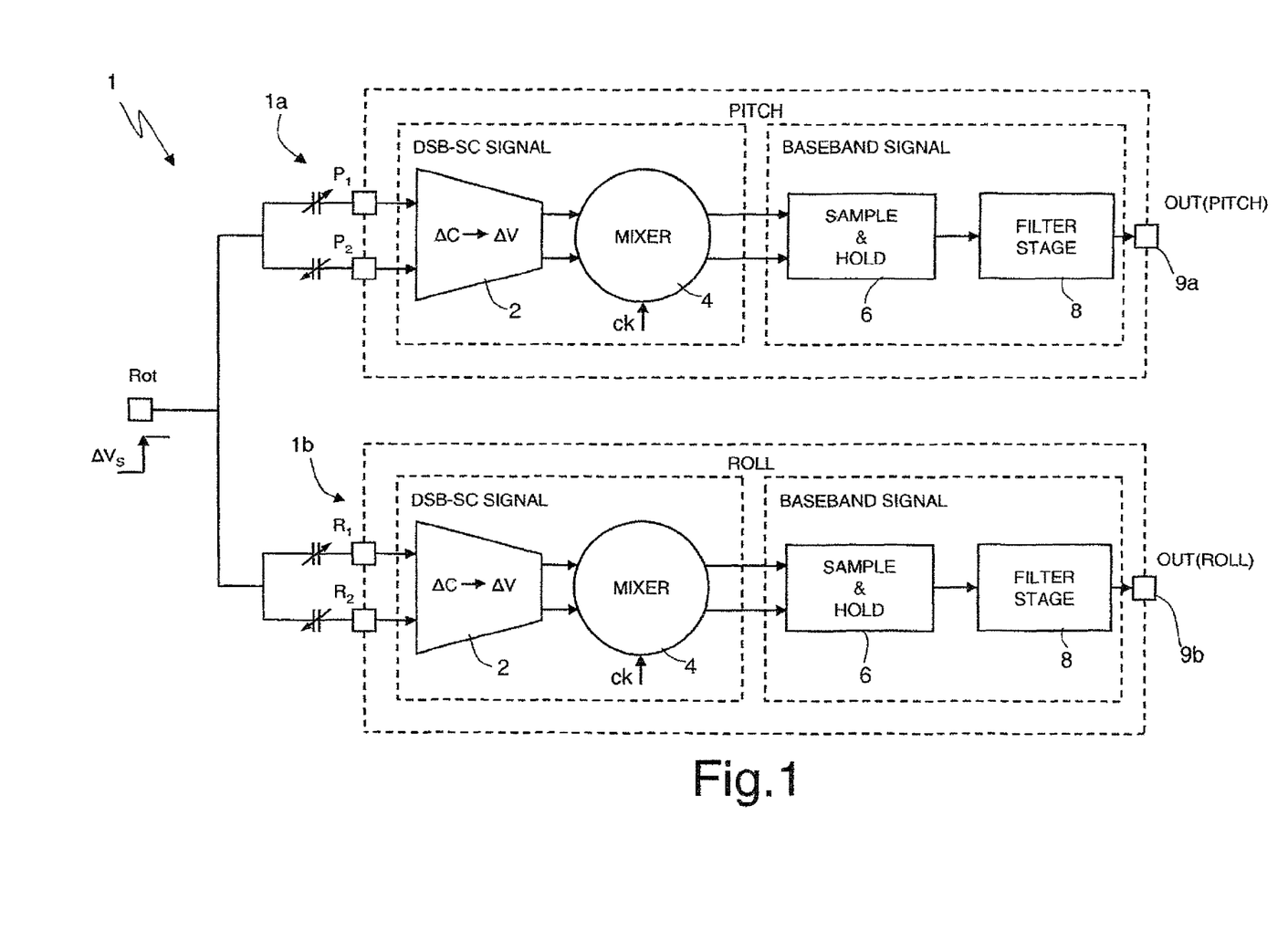
FIG. 1 shows a schematic block diagram of a reading circuit of a multi-axis MEMS capacitive gyroscope, of a known type.

In greater detail, and as illustrated in FIG. 1, the reading circuit, here designated by 1, has two distinct transduction chains, a first transduction chain, designated by 1a, for detection of the pitch angular velocity $\Omega_x$ and a second transduction chain, designated by 1b, for detection of the roll angular velocity $\Omega_y$. Also indicated in FIG. 1 are the contact of the mobile (or rotor) electrodes Rot, in common to all the sensing masses, the contacts of the fixed (or stator) electrodes $P_1$, $P_2$ associated to the pair of pitch-sensing masses, and of the fixed electrodes $R_1$, $R_2$ associated to the pair of roll-sensing masses (as well as the corresponding pairs of capacitors, having a capacitance variable in a differential manner). In particular, FIG. 1 shows the case where a single fixed electrode is associated to each sensing mass. Furthermore, an excitation signal, for example a voltage step $\Delta V_s$, is applied to the mobile electrodes Rot during reading operations.

Each transduction chain 1a, 1b, of a fully differential type and made using the switched-capacitor (SC) technology, comprises:

a charge amplifier 2, i.e., a charge/voltage converter, designed to minimize noise contributions and designed to convert the differential capacitive variation received at input (due to the displacement of the mobile electrodes with respect to the fixed electrodes) into a voltage variation signal of a fully differential type, this signal being a signal of a DSB-SC type on account of driving at the resonance frequency of the driving mass; the charge amplifier 2 has for this purpose a positive input and a negative input connected to a respective fixed electrode $P_1$, $P_2$ of the sensing masses;

a demodulator (or mixer) 4, cascaded to the charge amplifier 2 and forming therewith a measurement chain for signals of a DSB-SC type of the transduction chain, which is designed to carry out coherent demodulation of the amplitude-modulated signals of a DSB-SC type; in particular, by means of a clock signal CK in phase with the carrier of the signal (the driving angular velocity $\omega_z$), previously processed so as to minimize its phase delay, a coherent demodulation is obtained such as to bring the output signal, once again of a fully differential type, into baseband and reject the spurious components superimposed on the same signal (which have the same carrier frequency but are out of phase with respect to the information component by an angle of 90°;

a sample&hold stage 6, cascaded to the demodulator 4 and designed using the switched-capacitor (SC) technique, which has the purpose of transforming the fully-differential demodulated signal into a single-ended signal; and a filter stage 8, which is cascaded to the sample&hold stage 6 to form a measurement chain for baseband signals of the transduction chain and is designed to implement a transfer function of a second-order lowpass filter so as to reject all the undesirable components that fall outside the band of interest of the signal (typically up to 140 Hz), amongst which the known components, which, as a result of coherent demodulation, are at the resonance frequency (so-called residual offset) and at a frequency equal to twice the resonance frequency, and supply at output a useful analog signal OUT (of pitch or of roll) on a purposely provided output electrode 9a, 9b; the output signal contains the desired information of the pitch or roll angular velocity detected by the MEMS capacitive gyroscope.

BRIEF SUMMARY

The present Applicant has found that the reading circuit previously described is not, however, usable in the case where the multi-axis gyroscope has detection directions that do not coincide with its reference axes, being for example inclined by a given angle with respect to the reference axes.

One embodiment is a reading circuit that is able to operate in the case where the detection directions of the sensor are inclined with respect to the corresponding reference axes (for example, the axes of pitch and roll).

One embodiment is a multi-axis gyroscope that includes a microelectromechanical structure configured to rotate with respective angular velocities about respective reference axes, and a reading circuit. The microelectromechanical structure includes first and second detection elements sensitive along first and second detection directions, respectively, the first and second directions being different from one another, and are configured to generate respective detection quantities as a function of projections of the angular velocities in the first and second detection directions, the first detection directions being inclined with respect to the reference axes by a nonzero angle of inclination. The reading circuit includes: a combination stage configured to combine electrically together electrical quantities correlated to detection quantities generated by the first and second detection elements, so as to take into account the non-zero angle of inclination of the first and second detection directions with respect to the reference axes; and an output stage configured to provide electrical output signals based on combined electrical quantities received from the combination stage, each signal being correlated to a respective one of said angular velocities.

BRIEF DESCRIPTION OF THE SEVERAL VIEWS OF THE DRAWINGS

For a better understanding of the present disclosure, preferred embodiments thereof are now described, purely by way of non-limiting example and with reference to the annexed drawings, wherein.

DETAILED DESCRIPTION

Italian patent application TO2008A000876, from which the present application claims priority, discloses an integrated microelectromechanical gyroscope sensitive to angular velocities along three reference axes, pitch, roll and yaw, where the detection directions (i.e., the directions along which the sensing masses are sensitive) are inclined with respect to the reference axes by a given (nonzero) angle, in particular by an angle equal to 45°.

This gyroscope proves particularly advantageous in so far as it enables the MEMS structure and the corresponding electrical connections to be more symmetrical, rationalization of the area occupied, and maximization of the sensitivity of detection of the angular velocities.

Figure 2:
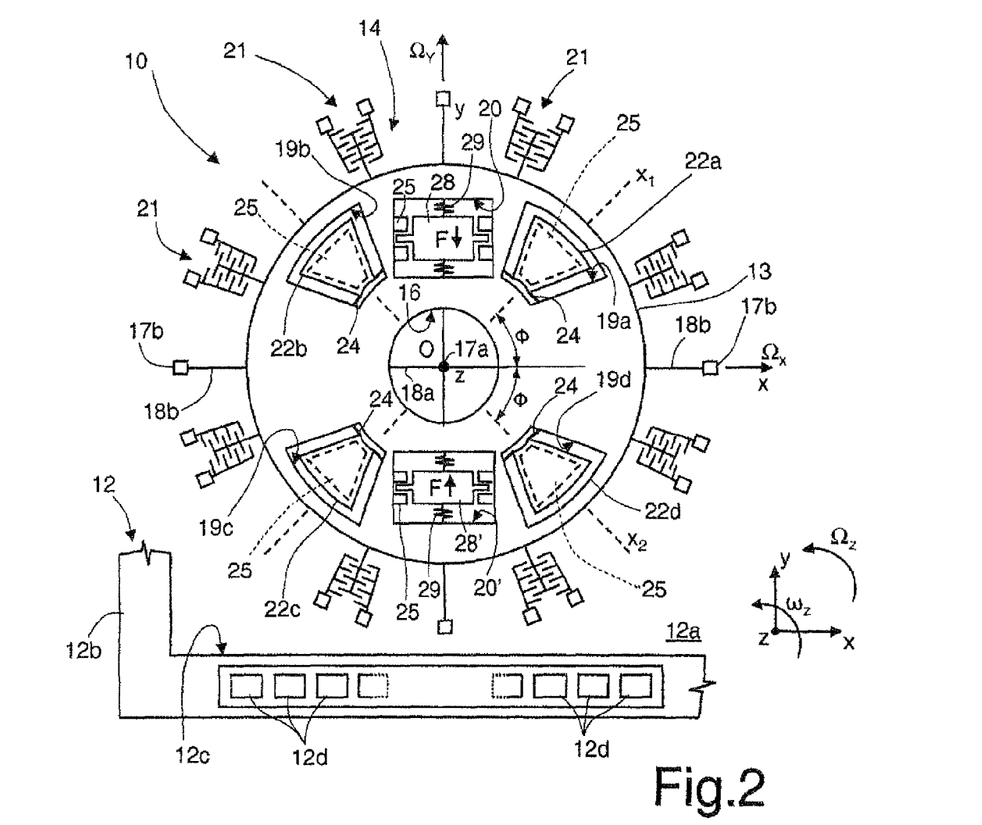
FIG. 2 shows a schematic top plan view of a microelectromechanical structure of a multi-axis MEMS capacitive gyroscope.

FIG. 2 shows, for example, an embodiment of a MEMS structure of a multi-axis gyroscope, designated by 10, made according to the teachings contained in the aforesaid Italian patent application.

The MEMS structure 10 is provided in a die 12, comprising a substrate 12a of semiconductor material (for example, silicon), and a frame 12b defining within it an open region 12c, overlying the substrate 12a, which is to house the sensing structures of the multi-axis gyroscope. The open region 12c has a generically square or rectangular configuration in a plane of the sensor xy (substantially parallel to the plane of the substrate 12a), defined by a first horizontal axis x and by a second horizontal axis y fixed with respect to the die 12; the frame 12b has sides substantially parallel to the horizontal axes x, y. Die pads 12d are arranged along at least one side of the frame 12b, aligned, for example, along the first horizontal axis x. In a way not illustrated, the die pads 12d enable electrical contact from outside of the sensing structures of the multi-axis gyroscope. The die pads 12d moreover have an axis of symmetry, in this case coinciding with the second horizontal axis y (which is orthogonal to their direction of alignment). In particular, the first and second horizontal axes x, y correspond to the pitch and of roll reference axes of the MEMS structure 10, around which the angular velocities of pitch $\Omega_x$ and roll $\Omega_y$ are detected.

The MEMS structure 10 comprises driving elements, housed within the open region 12c and including a driving mass 13 and a driving assembly 14.

The driving mass 13 has a substantially planar configuration with main extension in the plane of the sensor xy, and negligible size, with respect to the main extension, in a direction parallel to a vertical axis z, forming with the first horizontal axis x and the second horizontal axis y a set of three orthogonal axes (the vertical axis z moreover coinciding with the yaw reference axis of the MEMS structure 10). The driving mass 13 defines at the center an empty space 16, the center O of which coincides with the centroid and the center of symmetry of the entire structure. The driving mass 13 is moreover anchored to the substrate by means of a first anchorage 17a, set within the empty space 16, to which it is connected through first elastic anchoring elements 18a, and by means of further anchorages 17b, which are arranged outside the same driving mass 13 and to which the latter is connected by means of further elastic anchoring elements 18b. The elastic anchoring elements 18a, 18b enable a movement of rotary oscillation of the driving mass 13 about a driving axis passing through the center O, parallel to the vertical axis z and perpendicular to the plane of the sensor xy, with driving angular velocity $\omega_z$.

The driving mass 13 moreover has: a first pair of through openings 19a, 19c, which are aligned in a diametral direction in a first detection direction $x_1$, inclined with respect to the first horizontal axis x of the die 2 (coinciding with the pitch reference axis) by an angle of inclination $\Phi$ (considered in a counterclockwise direction), the value $\theta$ of which is preferably 45°, and are arranged on opposite sides with respect to the empty space 16; and a second pair of through openings 19b, 19d, which are aligned in a diametral direction in a second detection direction $x_2$, substantially orthogonal to the first detection direction $x_1$, and inclined with respect to the first horizontal axis x by the same angle of inclination $\Phi$ (considered in this case in an opposite, clockwise, direction), and are also arranged on opposite sides with respect to the empty space 16. In particular, each through opening 19a-19d has in the plane of the sensor xy the shape of a radial annulus sector, having arc-shaped inner and outer sides and radially extending lateral sides. The driving mass 13 moreover has a pair of further through openings 20, 20', having in plan view a substantially rectangular shape, and aligned along the second horizontal axis y (or, alternatively and in a way not illustrated, along the first horizontal axis x), and having a main extension in a direction transverse to the horizontal axis.

The driving assembly 14 comprises a plurality of sets of driving electrodes 21, extending outside the driving mass 13 in a radial direction and in a way angularly spaced at equal distances apart, constituted by electrodes in comb-fingered configuration. Suitable electrical biasing signals coming from an electronic driving circuit (here not illustrated), determine, by means of mutual and alternating attraction of the electrodes, the oscillatory rotary movement of the driving mass 13 about the vertical driving axis z, at a resonance frequency of oscillation and at the driving angular velocity $\omega_z$.

The MEMS structure 10 further comprises a first pair of acceleration sensors with axis parallel to the vertical axis z, and in particular a first pair of sensing masses 22a, 22c, arranged within a respective through opening 19a, 19c of the first pair so as to be completely enclosed and contained by the overall dimensions of the driving mass 3 in the plane of the sensor xy. Each of the sensing masses 22a, 22c has a shape corresponding to that of the respective through opening, and consequently has, in plan view, the generic shape of a radial annulus sector. Each of the sensing masses 22a, 22c is moreover supported by a pair of elastic supporting elements 24 extending within the respective through opening in a direction transverse to the first detection direction $x_1$, so as to be suspended on top of the substrate 12a. The elastic supporting elements 24 form torsional springs, which are rigid in regard to the rotary motion of the driving mass 13 (so that the sensing masses 22a, 22c follow the driving mass 13 in its driving motion), and moreover enable rotation of the sensing masses about an axis of rotation parallel to the direction of extension of the elastic supporting elements 24, and hence their movement out of the plane of the sensor xy (a movement that is not, instead, allowed for the driving mass 13).

In a similar way, the MEMS structure 10 comprises a second pair of acceleration sensors with axis parallel to the vertical axis z, and in particular a second pair of sensing masses 22b, 22d, housed within the through openings 19b, 19d of the second pair.

The sensing masses 22a-22d are consequently aligned in respective detection directions $x_1$, $x_2$, which are inclined with respect to the pitch and roll reference axes, about which act the angular velocities to be detected, and are moreover inclined with respect to the sides of the die 12 (parallel to the same reference axes). On the basis of the Coriolis theorem, the sensing masses are hence sensitive to angular velocities acting in the respective detection directions $x_1$, $x_2$.

A respective fixed electrode 25 is set underneath each of the sensing masses 22a-22d, for example constituted by a region of polycrystalline silicon formed on top of the substrate 12a. The fixed electrodes 25 form, with the respective sensing masses, sensing capacitors, having capacitance that is variable as a function of the displacement of the sensing mass itself due to the Coriolis force (and hence as a function of the angular velocity to be detected); in particular, the same sensing masses constitute the mobile electrodes of the sensing capacitors. The fixed electrodes 25 are connected to the reading circuit of the multi-axis gyroscope (here not illustrated) via the die pads 12d; in addition (in a way not illustrated), the sensing masses are electrically connected together and connected to a single electrical contact, which is also coupled to the aforesaid reading circuit via the die pads 12d.

The MEMS structure 10 further comprises a pair of further sensing masses 28, 28' housed within the further through openings 20, 20', suspended with respect to the substrate 12a and connected to the driving mass 3 via respective elastic supporting elements 29. In particular, the elastic supporting elements 29 are rigid with respect to the driving motion of the driving mass 13 (so that the further sensing masses 28, 28' follow the driving mass 13 in its movement of rotary oscillation) and moreover enable a linear movement of the respective sensing masses, in the case represented along the second horizontal axis y, in response to the centrifugal force. Coupled to each of the further sensing masses 28, 28' are mobile electrodes, which form sensing capacitors with plane and parallel faces with respective fixed electrodes 25, fixed with respect to the driving mass 13.

In use, the MEMS structure 10 is able to operate as a triaxial gyroscope and to detect the angular velocity of pitch $\Omega_x$ about the first horizontal axis x, the angular velocity of roll $\Omega_y$ about the second horizontal axis y, and an angular velocity of yaw $\Omega_z$, acting about the vertical axis z.

The pitch angular velocity $\Omega_x$ or, likewise, the roll angular velocity $\Omega_y$ (and more precisely the corresponding components in the first and second detection directions $x_1$, $x_2$), generate a Coriolis force on the sensing masses 22a-22b directed along the vertical axis z, which determines rotation thereof out of the plane of the sensor xy. Instead, the configuration of the elastic anchoring elements 18a, 18b is such as to inhibit, to a good approximation, movement of the driving mass 13 out of the plane of the sensor xy, thus enabling effective uncoupling of the detection motion of the sensing masses with respect to the driving motion. The displacement of the sensing masses 22a-22d out of the plane of the sensor xy causes a differential capacitive variation of the sensing capacitors associated to the same detection direction, which can hence be determined via an appropriate reading interface, operating according to a differential scheme.

Furthermore, a yaw angular velocity $52_z$, acting about the vertical axis z, generates a centrifugal force (designated by F) on the further sensing masses 28, 28' directed in a radial direction (hence directed as a centripetal force acting on the same masses), thus causing a displacement thereof in phase opposition in the radial direction. The value of the capacitive variation of the corresponding sensing capacitors is proportional to the angular velocity to be detected, which can hence be determined via the reading interface, operating once again according to a differential scheme.

The described MEMS structure 10 has a number of advantages. In particular, the configuration of the sensing masses 22a-22d (inclined with respect to the reference axes in the plane of the sensor) enables optimization of the exploitation of the area available for detection, increase in the sensitivity of the sensor, and improvement of the uniformity of the electrical characteristics and the robustness of the system to disturbance, thanks to the possibility of obtaining a substantial symmetry of the electrical connections to the die pads 12d.

However, the present Applicant has found that the structure described does not enable use of a traditional reading interface (for example, of the type described with reference to FIG. 1), on account of the fact that each of the sensing masses 22a-22d is affected both by the pitch angular velocity $\Omega_x$ and by the roll angular velocity $\Omega_y$, in so far as both of the angular velocities determine a non-zero velocity component in the first and second detection directions $x_1$, $x_1$. Instead, the reading circuit 1 described with reference to FIG. 1 has transduction chains that are totally distinct for each pair of sensing masses and that are to detect a respective angular velocity of pitch or roll, in so far as it presupposes that the sensing masses 22a-22c of a first pair are affected only by the pitch angular velocity $\Omega_x$, and that in the same way the sensing masses 22b-22d of the second pair are affected only by the roll angular velocity $\Omega_y$.

The present Applicant has hence found that a purposely designed reading interface able to discriminate, in the capacitive variation (or, likewise, in the variation of the amount of charge) associated to the sensing masses 22a-22d, the contribution due to the pitch angular velocity $\Omega_x$ from that due to the roll angular velocity $\Omega_y$, allows one to fully exploit the advantages of the MEMS structure 10.

Figure 3:
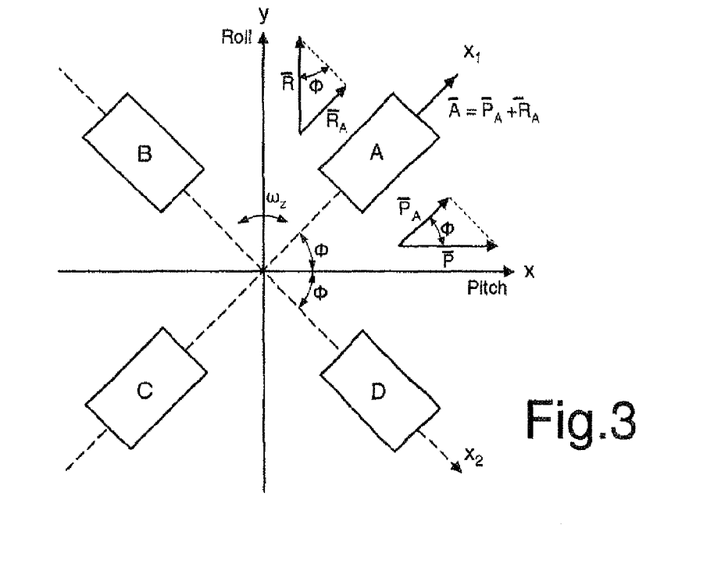
FIG. 3 shows a schematic and simplified representation of a portion of the gyroscope of FIG. 2.

FIG. 3 shows a schematic and simplified representation of the MEMS structure 10 of the multi-axis capacitive gyroscope previously described in detail, as regards the sensing masses 22a-22d, here represented simply by means of the respective fixed electrodes, designated by A, B, C and D, for detection of the angular velocities of pitch $\Omega_x$ and roll $\Omega_y$, here indicated simply by the respective vectors $\overline{P}$ and $\overline{R}$ acting along the respective reference axes of pitch (first horizontal axis x) and roll (second horizontal axis y). The sensing masses 22a-22d are aligned in pairs in the detection directions $x_1$, $x_2$, inclined by the angle $\Phi$ (assumed equal to 45°) with respect to the pitch and roll reference axes. Moreover, designated by $\overline{A}$, $\overline{B}$, $\overline{C}$ and $\overline{D}$ are the angular velocity vectors acting on the respective sensing masses 22a-22d in the detection directions $x_1$, $x_2$, given by the sum vector of the projections of the angular velocities of pitch and roll $\overline{P}$, $\overline{R}$ in the same detection directions $x_1$, $x_2$ (in FIG. 3 these projections are indicated by $\overline{P}_A$, $\overline{R}_A$ for the sensing mass 22a; a similar notation is subsequently used also for the other sensing masses).

By applying simple geometrical considerations, it is possible to obtain the following relations:

$$\overline{A} = \overline{P}_A + \overline{R}_A = \overline{P}\cdot(\cos\Phi) + \overline{R}\cdot(\sin\Phi) = \frac{1}{\sqrt{2}}\cdot\overline{P} + \frac{1}{\sqrt{2}}\cdot\overline{R}$$

$$\overline{B} = \overline{P}_B + \overline{R}_B = -\overline{P}\cdot(\sin\Phi) + \overline{R}\cdot(\cos\Phi) = -\frac{1}{\sqrt{2}}\cdot\overline{P} + \frac{1}{\sqrt{2}}\cdot\overline{R}$$

$$\overline{C} = \overline{P}_C + \overline{R}_C = -\overline{P}\cdot(\cos\Phi) - \overline{R}\cdot(\sin\Phi) = -\frac{1}{\sqrt{2}}\cdot\overline{P} - \frac{1}{\sqrt{2}}\cdot\overline{R}$$

$$\overline{D} = \overline{P}_D + \overline{R}_D = \overline{P}\cdot(\sin\Phi) - \overline{R}\cdot(\cos\Phi) = \frac{1}{\sqrt{2}}\cdot\overline{P} - \frac{1}{\sqrt{2}}\cdot\overline{R}$$

It follows that each sensing mass 22a-22d generates, following upon its movement, a capacitive variation (which is proportional, as has been said previously, to the angular velocity sensed thereby in the respective detection direction) as a function both of the pitch angular velocity $\Omega_x$ and of the roll angular velocity $\Omega_y$.

The present Applicant has also realized that there exist a particular combinations of the contributions of angular velocity (and consequently of the associated capacitive contributions) acting on the four sensing masses 22a-22d such as to enable the desired angular velocities acting along the pitch and roll reference axes to be obtained. In particular, it is possible to obtain a total contribution of roll angular velocity by means of the following first combination expression:

$$\overline{A} + \overline{B} - \overline{C} - \overline{D} = \frac{1}{\sqrt{2}}\overline{P} + \frac{1}{\sqrt{2}}\overline{R} - \frac{1}{\sqrt{2}}\overline{P} +$$
$$\frac{1}{\sqrt{2}}\overline{R} - \left(-\frac{1}{\sqrt{2}}\overline{P} - \frac{1}{\sqrt{2}}\overline{R}\right) - \left(\frac{1}{\sqrt{2}}\overline{P} - \frac{1}{\sqrt{2}}\overline{R}\right) = 2\sqrt{2}\,\overline{R}$$

and likewise a total contribution of pitch angular velocity, by means of the following second combination expression:

$$\overline{A} - \overline{B} - \overline{C} + \overline{D} = \frac{1}{\sqrt{2}}\overline{P} + \frac{1}{\sqrt{2}}\overline{R} - \left(-\frac{1}{\sqrt{2}}\overline{P} + \frac{1}{\sqrt{2}}\overline{R}\right) -$$
$$\left(\frac{1}{\sqrt{2}}\overline{P} - \frac{1}{\sqrt{2}}\overline{R}\right) + \frac{1}{\sqrt{2}}\overline{P} - \frac{1}{\sqrt{2}}\overline{R} = 2\sqrt{2}\,\overline{P}$$

The two previous combination expressions, in addition to enabling the useful information for each reference axis of interest to be obtained (axes of pitch and roll), afford the advantage of increasing the sensitivity of the multi-axis gyroscope, given the same area used for the sensing structure, by a factor of $\sqrt{2}$ (the sensitivity being in fact equal to 2·R for the axis of roll and 2·P for the axis of pitch, in structures of a traditional type).

An aspect of the present disclosure hence envisages a circuit implementation, with purposely modifications to the reading interface of the MEMS gyroscope (which once again includes a measurement chain for DSB-SC signals, followed by a measurement chain for baseband signals), of the aforesaid combination expressions, in particular by appropriately combining together electrical quantities associated to the displacements of sensing masses 22a-22d not referred to the same detection direction $x_1$, $x_2$ (or, likewise, referred to different detection directions). In this way, it is possible to obtain at output, after the subsequent processing operations, electrical signals directly proportional to the sole roll or pitch angular velocities, which are to be detected. In particular, these electrical quantities can be advantageously combined before processing carried out by the measurement chains for baseband signals of the transduction chain in the reading circuit, so as to obtain electrical signals that can subsequently be appropriately processed (in a traditional way) in the baseband.

As will be illustrated in detail hereinafter, an aspect of the present disclosure hence envisages introduction into the reading circuit of the MEMS gyroscope, of an additional combination stage, designed to implement the appropriate combination of electrical quantities associated to the various sensing masses 22a-22b in such a way as to extrapolate the information useful for detection of the sole angular velocities of roll $\Omega_x$ and pitch $\Omega_y$.

Figure 4:
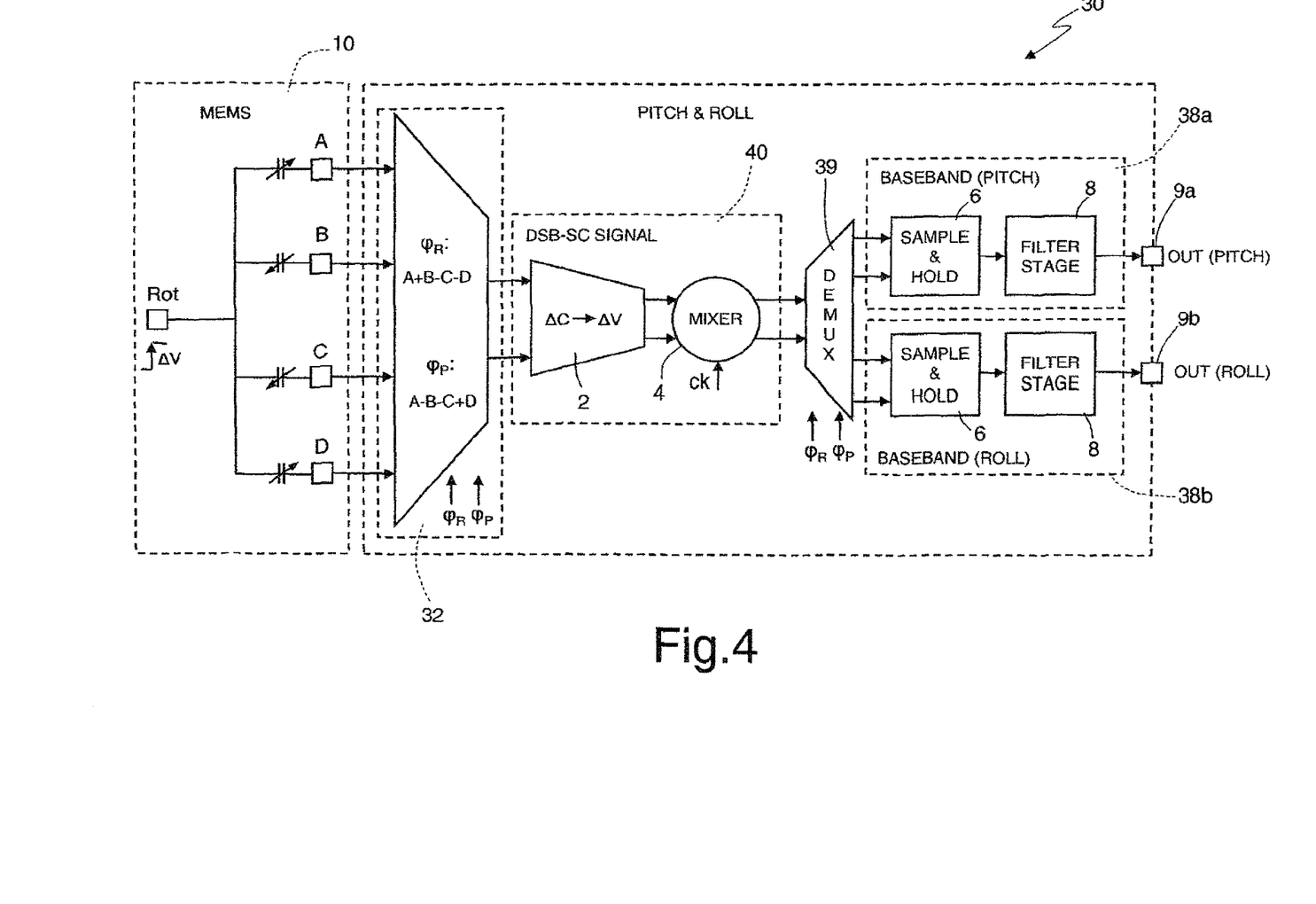
FIG. 4 shows a schematic block diagram of a reading circuit of a multi-axis MEMS capacitive gyroscope, according to a first embodiment of the present disclosure.

In detail, FIG. 4 (where elements that are similar to others already described previously are designated by the same reference numbers and will not be described in detail again) shows a reading circuit 30 according to a first embodiment of the present disclosure, where the aforesaid combination stage, designated by 32, is set upstream of the entire transduction chain (i.e., upstream of the charge amplifier 2 of the measurement chain for DSB-SC signals), and has inputs directly connected to the electrodes of the MEMS structure 10.

In a way similar to what is illustrated in FIG. 3, the fixed electrodes corresponding to the sensing masses 22a-22d are designated by A, B, C and D, on the hypothesis that associated to each of the sensing masses is a single fixed electrode; again illustrated are also the sensing capacitors with opposite capacitive variations formed between the fixed electrodes of sensing masses aligned in a same detection direction $x_1$, $x_2$, and the common mobile electrode Rot (the mobile electrode being electrically connected to the sensing masses).

The combination stage 32 also receives at input from a timing circuit (not illustrated) a first phase signal $\phi_R$ and a second phase signal $\phi_P$, in particular square-wave signals in phase opposition with respect to one another, and is configured, by means of activation of suitable switches, appropriately sized and controlled by the aforesaid phase signals, so as to short-circuit in pairs to one another the fixed electrodes A, B, C and D. In particular, the combination stage 32 implements appropriate combinations of the charge contributions (or of the capacitive variation) generated by the sensing masses 22a-22b, to enable detection, by means of a subsequent processing of a first combination, of the angular velocity about the roll reference axis in a first reading phase, and to enable detection, by means of a subsequent processing of a second combination, the angular velocity about the pitch reference axis in a second reading phase, distinct from the first reading phase. In greater detail, with reference also to FIG. 5, the combination stage 32 comprises an array of switches, namely: a first switch 34, connected between the fixed electrode A (associated to the sensing mass 22a) and the fixed electrode B (associated to the sensing mass 22b), and controlled by the first phase signal $\phi_R$; a second switch 35, which is connected between the fixed electrode C (associated to the sensing mass 22c) and the fixed electrode D (associated to the sensing mass 22d) and which is also controlled by the first phase signal $\phi_R$; a third switch 36, which is connected between the fixed electrode B and the fixed electrode C and is controlled by the second phase signal $\phi_P$; and a fourth switch 37, which is connected between the fixed electrode A and the fixed electrode D and which is also controlled by the second phase signal $\phi_P$.

Figure 5:
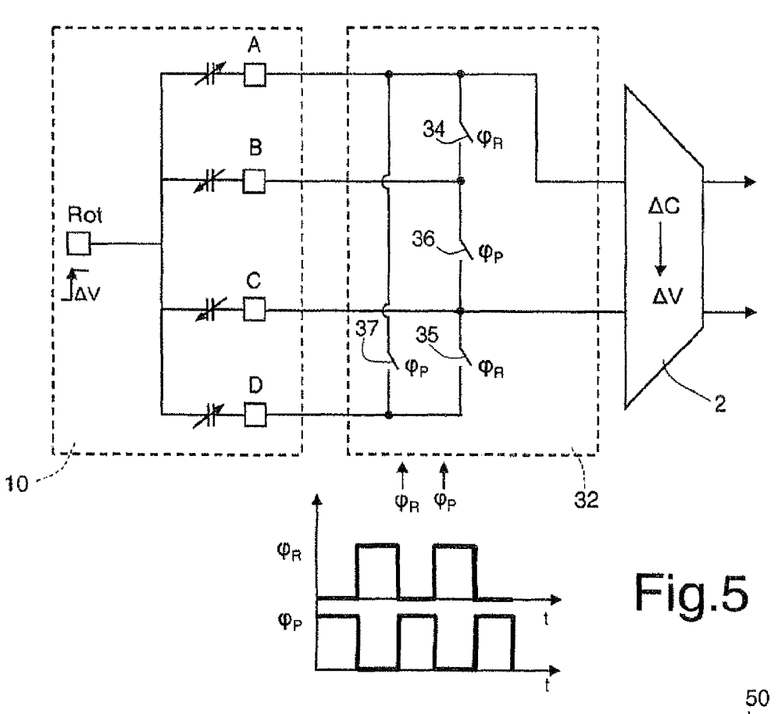
FIG. 5 shows in greater detail the implementation of a combination stage in the circuit of FIG. 4.

In addition, the combination stage 32 implements a direct electrical connection between the fixed electrode A and a non-inverting input of the charge amplifier 2, and a further direct electrical connection between the fixed electrode C and an inverting input of the same charge amplifier 2.

In use, in a first reading phase, corresponding to the high active interval of the first phase signal $\phi_R$, the fixed electrodes A and B are shorted to one another (and are moreover connected to the non-inverting input of the charge amplifier 2), and the fixed electrodes C and D are shorted to one another (and are moreover connected to the inverting input of the charge amplifier 2). In the first phase, given also the relation of direct proportionality between the contributions of angular velocity and the charge contributions or capacitive variations, the aforesaid first combination expression $\overline{A}+\overline{B}-\overline{C}-\overline{D}$ is thus implemented, to obtain at output from the charge amplifier 2 a signal of voltage variation correlated to the sole roll angular velocity $\Omega_x$.

In a second reading phase, subsequent to and distinct from the first phase, corresponding to the high active interval of the second phase signal $\phi_P$ (during which the first phase signal $\phi_R$ is at the low logic level), the fixed electrodes A and D (which are moreover connected to the non-inverting input of the charge amplifier 2) are instead shorted to one another, and the fixed electrodes B and C (which are moreover connected to the inverting input of the charge amplifier 2) are shorted to one another. In the second phase, the aforesaid second combination expression $\overline{A}-\overline{B}-\overline{C}+\overline{D}$ is hence implemented, to obtain at output from the charge amplifier 2 a voltage-variation signal correlated to the sole pitch angular velocity $\Omega_y$.

It may hence be noted that the array of switches in the combination stage 32 implements a sort of array of weights for the combination of the fixed electrodes A, B, C and D and of the corresponding capacitive contributions, determining the sign, positive or negative, of the charge contributions associated to these electrodes in the summation generating the aforesaid first or second combination expression.

As illustrated in FIG. 4, the differential signal of voltage variation at output from the charge amplifier 2 is sent to the demodulator 4, which carries out coherent demodulation thereof using the clock signal CK in phase with the driving angular velocity $\omega_z$.

The reading circuit 30 hence advantageously envisages in this case a single measurement chain for DSB-SC signals, designated as a whole by 40 and constituted by the single charge amplifier 2 and by the single demodulator 4, connected in cascaded fashion. This single measurement chain provides in fact a time-division reading (timed by the aforesaid first and second phase signals) of the roll and pitch reference axes: in particular, during the first phase, the demodulated signal (at output from the demodulator 4) represents the roll angular velocity that is to be detected, whereas, during the second phase, the demodulated signal represents the pitch angular velocity.

Possibly (in a way not illustrated), the single measurement chain for DSB-SC signals 40 may be used also for time-division reading of the yaw angular velocity $\Omega_z$ (corresponding to the yaw reference axis), by simply introducing a third reading phase (and a third phase signal $\phi_Y$) dedicated thereto, that will be shifted with respect to the previous reading phases (associated to the phase-signals $\phi_R$ and $\phi_P$); in this case further switches will be provided, controlled by the third phase signal $\phi_Y$ to connect to the inputs of the charge amplifier 2 the fixed electrodes 25 associated to the further sensing masses 28, 28', sensitive to the yaw angular velocity $\Omega_z$. In this third step, the switches 34, 35, 36 and 37 are open; consequently, to prevent the fixed electrodes A, B, C and D from remaining floating, a further four switches are introduced, respectively connected between the fixed electrodes A, B, C, D and a terminal at a known potential (preferably the same potential used as input common mode of the charge amplifier 2 during the first and the second reading phases) so as to keep the microelectromechanical structure completely biased.

Downstream of the demodulator 4, there is instead again envisaged the use of two distinct measurement chains for baseband signals 38a, 38b for the signals corresponding to the angular velocities of pitch and roll, respectively, each chain comprising a respective sample&hold stage 6, cascaded by a filter stage 8, designed to supply on the purposely provided output electrode 9a, 9b the useful analog output signal, containing the desired information of the pitch or roll angular velocity detected by the MEMS structure 10.

In particular, the reading circuit 30 comprises in this case a demultiplexer 39, which has its inputs connected to the differential output of the demodulator 4, also receives the first and second phase signals $\phi_R$, $\phi_P$, and is configured in such a way as to connect the output of the demodulator 4 to the first measurement chain for baseband signals 38a (corresponding to the pitch angular velocity) during the first reading phase, and to the second measurement chain for baseband signals 38b (corresponding to the roll angular velocity) during the second reading phase.

Advantageously, and as is evident from the foregoing discussion, the first embodiment described enables reduction of the area occupation and consumption of electric power of the reading circuit 30 associated to the MEMS structure 10 of the multi-axis gyroscope in so far as it envisages the use of just one measurement chain for DSB-SC signals. However, this solution also involves the fact that the demodulation, at least in the case of a biaxial gyroscope, occurs with a halved number of samples (in so far as the angular velocities of pitch and roll are read alternately, and the single measurement chain for DSB-SC signals is used in time division).

A second embodiment of the reading circuit, here designated by 30' (see FIG. 6) hence envisages the use of two distinct measurement chains for the DSB-SC signals, designated by 40a, 40b (or possibly, in a way not illustrated, of three distinct measurement chains, in the case of a triaxial gyroscope), respectively for the DSB-SC signals corresponding to the angular velocities of pitch and roll, each chain comprising a respective charge amplifier 2 and a respective demodulator 4, cascaded together.

Figure 6:
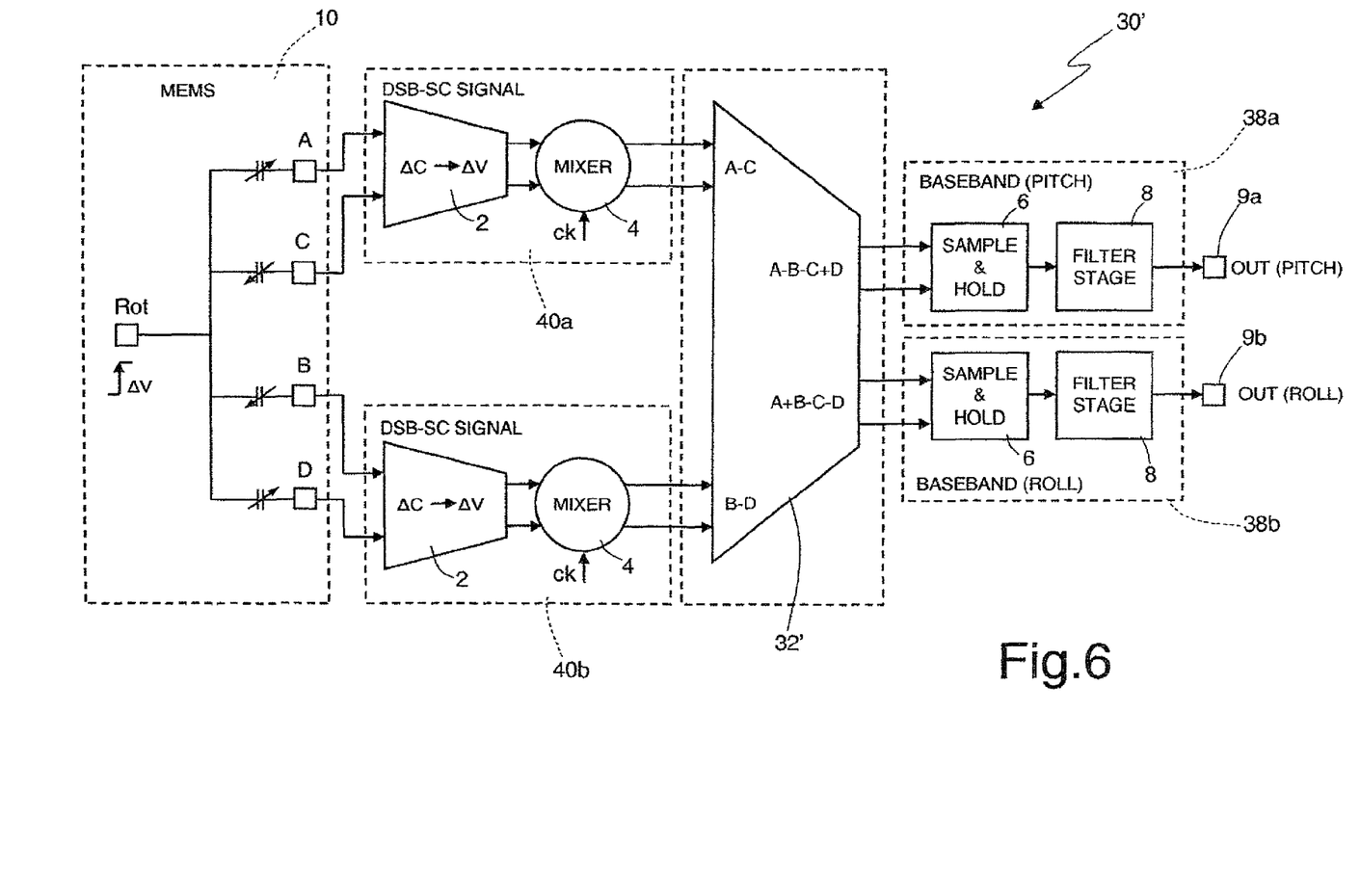
FIG. 6 shows a schematic block diagram of a reading circuit of a multi-axis MEMS capacitive gyroscope, in accordance with a second embodiment of the present disclosure.

The combination stage, here designated by 32', is positioned downstream of the demodulators 4 of the two measurement chains for DSB-SC signals 40a, 40b, and has its inputs connected to the differential outputs of the same demodulators 4.

In greater detail, the first measurement chain for DSB-SC signals, designated by 40a, is connected at input to the fixed electrodes A and C and acquires and processes jointly the capacitive contributions associated to the sensing masses 22a and 22c of the first pair of sensing masses aligned in the first detection direction $x_1$. In particular, the charge amplifier 2 of the first measurement chain has its non-inverting input connected to the fixed electrode A and its inverting input connected to the fixed electrode C so as to supply at output a voltage-variation signal, of a fully-differential type, correlated to the difference (A-C) of the capacitive contributions associated to these electrodes.

In a similar way, the second measurement chain for DSB-SC signals 40b is connected at input to the fixed electrodes B and D and acquires and processes jointly the capacitive contributions associated to the sensing masses 22b and 22d of the second pair of sensing masses aligned in the second detection direction $x_2$. In particular, the charge amplifier 2 of the second measurement chain has its non-inverting input connected to the fixed electrode B and its inverting input connected to the fixed electrode D so as to supply at output a voltage-variation signal, of a fully-differential type, correlated to the difference (B-D) of the capacitive contributions associated to these electrodes.

The combination stage 32' here comprises an adder circuit of a switched-capacitor type, of a known type and hence not described in detail, which processes the signals received at input and combines them appropriately in such a way as to implement again the aforesaid first and second combination expressions. In particular, the combination stage 32' implements simultaneously an operation of sum of the signals received at input for generating at output a first processed signal associated to the first combination expression, $\overline{A}+\overline{B}-\overline{C}-\overline{D}$, and an operation of difference of the same signals for generating at output a second processed signal, associated to the second combination expression, $\overline{A}-\overline{B}-\overline{C}+\overline{D}$. Note that, in this second embodiment, unlike the previous one, the combination stage 32' is configured so as to process jointly the voltage signals at output from the demodulator blocks, and not directly the charge packets received from the sensing masses.

The processed signals, which are again of a differential type, at output from the combination stage 32', are again processed in two distinct measurement chains for baseband signals, designated once again by 38a, 38b, corresponding to the angular velocities of pitch and roll, respectively. In particular, the first processed signal associated to the first combination expression, $\overline{A}+\overline{B}-\overline{C}-\overline{D}$, hence representing just the roll angular velocity $\Omega_x$, is sent to the second measurement chain for baseband signals 38b, which amplifies, filters and transforms the signal into a continuous-time signal, and supplies on the second output electrode 9b a signal directly correlated to the same roll angular velocity $\Omega_x$. The second processed signal, associated to the second combination expression, $\overline{A}-\overline{B}-\overline{C}+\overline{D}$, hence representing just the pitch angular velocity $\Omega_y$, is instead sent to the first measurement chain for baseband signals 38a, which amplifies, filters and transforms the signal into a continuous-time signal, and supplies on the first output electrode 9a a signal correlated to the pitch angular velocity $\Omega_y$.

Advantageously, and as is evident from the foregoing discussion, the second embodiment described enables a demodulation to be carried out with a maximum number of samples (in so far as it uses two distinct measurement chains both for the DSB-SC signals and for the baseband signals), but has the drawback of requiring an increase in area and consumption as compared to the first embodiment previously described. Furthermore, it is known that processing of voltage signals is in general more burdensome, from the standpoint of resources, as compared to processing of charge packets required to obtain the same information content therefrom.

The advantages of the reading circuit for a multi-axis MEMS gyroscope provided according to the present disclosure hence emerge clearly from the foregoing description.

In particular, it is again emphasized that the proposed circuit solution makes it possible in a simple and effective way to obtain the information associated to the angular velocities to be detected about the roll and pitch reference axes, starting from detection signals associated to detection directions inclined with respect to the same reference axes, using the measurement chains for DSB-SC signals and for baseband signals required for conditioning the signals at output from the MEMS structure of the gyroscope.

The reading circuit maintains the signal-to-noise ratio unaltered, and instead increases the sensitivity of detection of the angular velocities by a factor of $\sqrt{2}$.

Of the embodiments described, the one that uses multiplexing, or time-division reading, of the channels associated to the various angular velocities (first embodiment described) is particularly advantageous as regards the reduction of the consumption levels and of the area of the integrated circuit, as well as of the costs associated to its manufacturing.

Figure 7:
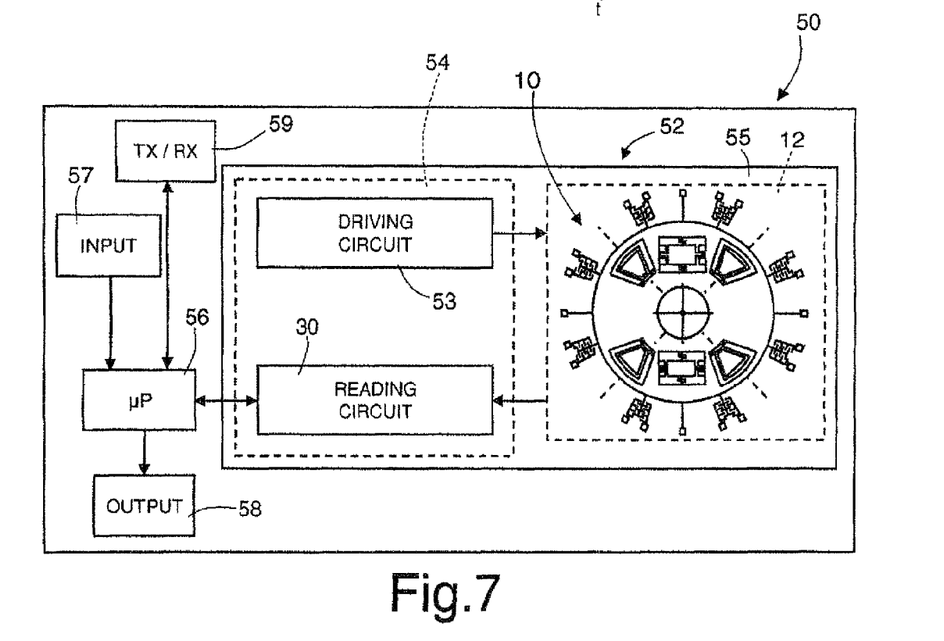
FIG. 7 shows a block diagram of a MEMS capacitive gyroscope and of a corresponding electronic device, according to a further aspect of the present disclosure.

The aforesaid characteristics render the multi-axis gyroscope particularly indicated for integration in an electronic device, which can be used in a plurality of electronic systems, for example, in inertial-navigation systems, automotive systems, or in systems of a portable type, such as, for example, a PDA (Personal Digital Assistant), a portable computer, a mobile phone, a digital audio player, a photographic camera or videocamera, a controller of a videogames console, the electronic device being generally able to process, store, transmit and receive signals and information. In detail, FIG. 7 shows an electronic device 50, comprising the multi-axis MEMS gyroscope, here designated by 52 and comprising: the MEMS structure 10 previously described; the reading circuit 30 (or, likewise and in a way not illustrated, the reading circuit 30' of the second embodiment described); and a driving circuit 53, operatively coupled to the driving assembly 14 to impart the driving movement upon the various driving masses 13 of the MEMS structure 10 and supply biasing signals to the same MEMS structure 10 (in a per-se known manner, not illustrated in detail herein).

Advantageously, the driving circuit 53 and the reading circuit 30 can be provided in completely integrated technology (for example of a CMOS or biCMOS type) and can be integrated in a further die of semiconductor material, designated as a whole by 54, which can be placed, together with the die 12 of the MEMS structure 10, within one and the same package, designated as a whole by 55 (the two dice being electrically and mechanically connected with known techniques), thus obtaining a further reduction in area occupation.

The electronic device 50 further comprises: an electronic control unit 56, for example a microprocessor, connected to the reading circuit 30, and designed to supervise general operation of the electronic device 50, for example, also as a function of the angular velocities detected and determined; an input stage 57, provided with appropriate data-input elements which can be used by a user (for example, a keypad); an output stage 58, provided with appropriate data-output elements (for example, in the form of a display); and a transmission/reception stage 59, controlled by the electronic control unit 56 for transmission and reception of data, for example with any wireless mode of a known type (such as, for example, Bluetooth, Wifi, IR, etc.).

Finally, it is clear that modifications and variations may be made to what has been described and illustrated herein, without thereby departing from the scope of the present disclosure.

In particular, it is clear that the solution described can find advantageous application also in the case where the angle of inclination between the detection directions and the reference axes is different from 45°, for example in the case where this angle is comprised between 40° and 50°; of course, the precision of the detection of the pitch and roll angular velocities will be greater for angles of inclination equal or close to the value of 45°. Alternatively, in the case where the angle of inclination differs sensibly from the value of 45°, different operations of combination of the charge contributions (or of the capacitive variations) associated to the various electrodes, or of the electrical quantities associated thereto, may be envisaged. In particular, the array of switches in the combination stage (see the first embodiment) may in this case be configured so as to associate to each electrode an appropriate weight for generating the desired combination.

Furthermore, the reading circuit previously described can be used, with appropriate modifications, in the case where two fixed electrodes in a differential configuration are associated to each sensing mass of the multi-axis gyroscope. Also in this case, in fact, a reading phase may be envisaged dedicated to each axis to be detected, with the advantage of having a single chain for DSB-SC reading for the axes read, and the associated saving in area and current; however, the increase in sensitivity by the factor $\sqrt{2}$ will not be obtained.

It is also evident that the reading circuit previously described can find advantageous application also in other types of multi-axis transducers (in addition to the gyroscope described), having detection directions (i.e., sensing directions of the corresponding detection elements) inclined with respect to the reference axes (i.e., the axes along which act the physical quantities to be detected and transduced); for example, this circuit can be used in axial-flux magnetometers, or else in inertial accelerometers. More in general, the reading circuit described can be used where the physical quantity to be detected can be transduced through a charge reading of a time-division fully-differential SC type.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a multi-axis gyroscope configured to rotate in response to angular velocities about a first axis and a second axis, the gyroscope including:
a first pair of detection elements, each detection element being configured to detect rotation about the first axis and the second axis, the first pair of detection elements being aligned with each other along a third axis at a non-zero angle of inclination with respect to the first and second axes, the first pair being configured to generate a first set of detection signals;
a second pair of detection elements, each detection element being configured to detect rotation about the first axis and the second axis, the second pair of detection elements being aligned with each other along a fourth axis different from the third axis, the fourth axis being at a non-zero angle of inclination from the first and second axes, the second pair being configured to generate a second set of detection signals;
a reading circuit coupled to the gyroscope, the reading circuit including:
a combination stage configured to combine the first and second sets of detection signals to produce a first combination signal and a second combination signal, the combination stage configured to account for the non-zero angle of inclination of the third and fourth axes, the combination stage is configured to receive timing signals to short circuit in pairs one of the detection elements from the first pair and one of the detection elements from the second pair; and
an output stage configured to provide a first and a second electrical output signal based on the first and second combination signals received from the combination stage, the first output signal being correlated to the angular velocity about the first axis and the second output signal being correlated to the angular velocity about the second axis.

2. The device of claim 1, wherein the reading circuit includes a plurality of inputs electrically connected between outputs from the gyroscope and inputs of the combination stage.

3. The device of claim 1, wherein the timing signals include a first timing signal and a second timing signal, the combination stage including a plurality of switches configured to receive the first and second timing signals, the plurality of switches being configured to short circuit one of the detection elements from the first pair and one of the detection elements from the second pair in response to the first timing signal and to short circuit the other one of the detection elements from the first pair and the other one of the detection elements from the second pair in response to the second timing signal.

4. The device of claim 3, wherein the first pair and the second pair of detection elements are capacitive detection elements and the combination stage is configured to generate a first combination of charge contributions in response to the first timing signal and a second combination of charge contributions in response to the second timing signal.

5. A device, comprising:
a rectangular frame, the frame having a first side that extends along a first axis and a second side that extends along a second axis, the second axis being transverse to the first axis;
a first pair of sensing electrodes within the frame, the first pair of sensing electrodes being aligned with each other along a third axis that is transverse to the first and the second axis, each sensing electrode of the first pair being configured to detect rotations about the first axis and the second axis;
a second pair of sensing electrodes within the frame, the second pair of sensing electrodes being aligned with each other along a fourth axis that is transverse to the third axis, each sensing electrode of the second pair being configured to detect rotations about the first and the second axis; and
a reading circuit coupled to the first pair and the second pair of sensing electrodes, the reading circuit being configured to output a first output signal corresponding to rotations about the first axis and a second output signal corresponding to rotations about the second axis the reading circuit being configured to receive timing signals to turn off in pairs one of the sensing electrodes from the first pair and one of the sensing electrodes from the second pair.

6. The device of claim 5 wherein:
the first pair of sensing electrodes is configured to output a first sensing signal and a second sensing signal, each of the first and second sensing signals having a component associated with rotations about the first axis and a component associated with rotations about the second axis; and
the second pair of sensing electrodes is configured to output a third sensing signal and a fourth sensing signal, each of the third and fourth sensing signals having a component associated with rotations about the first axis and a component associated with rotations about the second axis.

7. The device of claim 6 wherein the reading circuit is configured to receive the first, second, third, and fourth sensing signals, the reading circuit configured to process the first, second, third, and fourth sensing signals to output the first and second output signals.

8. The device of claim 7 wherein the reading circuit includes a combination stage configured to receive the first, second, third, and fourth sensing signals, the combination stage configured to output a first combination signal and a second combination signal.

9. The device of claim 8 wherein the reading circuit includes a first processing module and a second processing module, the first processing module configured to output the first output signal and the second processing module is configured to output the second output signal.

10. The device of claim 5, further comprising a driving assembly within the frame, the driving assembly including a first set of driving electrode and a second set of driving electrodes, the first pair and the second pair of sensing electrodes being between the first and second set of driving electrodes.

11. The device of claim 5, further comprising a first substrate and a second substrate, the frame being on the first substrate and the reading circuit being on the second substrate.

12. The device of claim 11 wherein the first side of the frame includes a plurality of contacts that couple the first pair and second pair of sensing electrodes to the reading circuit.

13. A device, comprising:
a reading circuit for a MEMS gyroscope, the reading circuit including:
an input stage being configured to receive a first pair of sensing signals from a first pair of sensing electrodes and a second pair of sensing signals from a second pair of sensing electrodes, each of the signals of the first pair of sensing signals and the second pair of sensing signals including components associated with rotations of the gyroscope around a first axis and a second axis; and
an output stage coupled to the input stage, the output stage being configured to output a first output signal associated with rotations about the first axis and a second output signal associated with rotations about the second axis, the reading circuit being configured to receive timing signals to turn off in pairs one of the sensing electrodes from the first pair and one of the sensing electrodes from the second pair.

14. The device of claim 13 wherein the input stage is configured to combine the components associated with rotations of the gyroscope around the first axis from each of the first pair and second pair of sensing signals to generate a first combination signal and to combine the components associated with rotations of the gyroscope around the second axis from each of the first pair and second pair of sensing signals to generate a second combination signal.

15. The device of claim 14 wherein the reading circuit includes a measurement stage configured to receive the first combination signal and the second combination signal, the measurement stage including a charge amplifier and a demodulator.

16. The device of claim 14 wherein the output stage includes a first axis processing stage that is configured to output the first output signal and a second axis processing stage that is configured to output the second output signal.

17. The device of claim 16 wherein the first axis processing stage includes a first sampling stage and a first filter stage, the second axis processing stage includes a second sampling stage and a second filter stage.

* * * * *